(No Model.)
J. F. EAST.
CRATE.
No. 597,608. Patented Jan. 18, 1898.
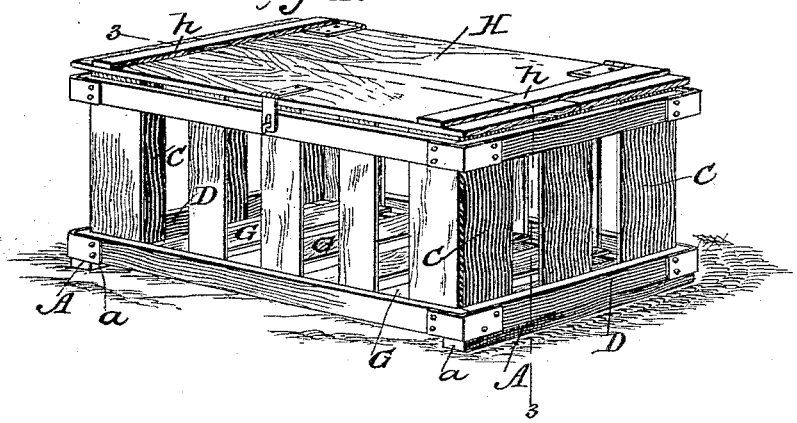
Fig. 1.
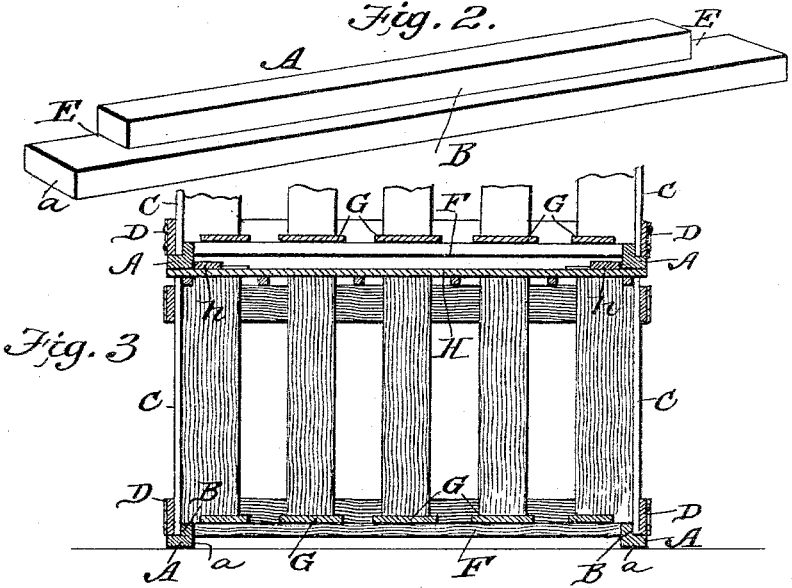
Fig. 2.
Fig. 3.
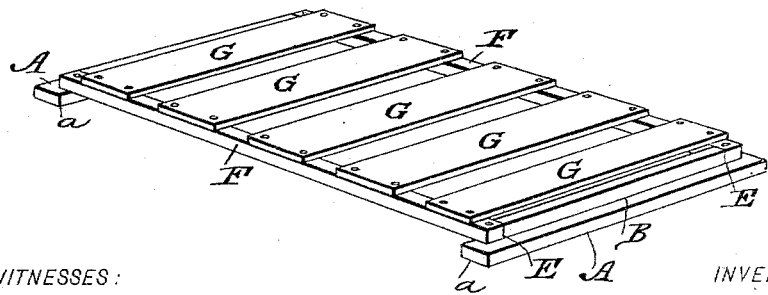
Fig. 4.
WITNESSES:
M. D. Blondell
P. B. Turpin
INVENTOR
John F. East.
BY Munn & Co.
ATTORNEYS.
THE NORRIS PETERS CO., PHOTO-LITHO., WASHINGTON, D. C.

UNITED STATES PATENT OFFICE.

JOHN F. EAST, OF NORFOLK, VIRGINIA.

CRATE.

SPECIFICATION forming part of Letters Patent No. 597,608, dated January 18, 1898.

Application filed July 29, 1897. Serial No. 646,301. (No model.)

*To all whom it may concern:*

Be it known that I, JOHN F. EAST, residing in the city of Norfolk, county of Norfolk, and State of Virginia, have invented a new and useful Improvement in Crates, of which the following is a specification.

My invention is an improvement in crates, seeking to provide an elastic bottom therefor which will furnish a perfect system of ventilation in berry and other crates, especially those handled in refrigerator-cars, and has for an object, among others, to furnish a crate equal in strength with the ordinary heavy solid-bottom crate, but which will be furnished with an elastic or springy bottom having a perfect system of ventilation.

The invention consists in certain novel constructions and combinations of parts, as will be hereinafter described, and pointed out in the claims.

In the drawings, Figure 1 shows my crate ready for use. Fig. 2 is a detail view of one of the sill-bars. Fig. 3 is a detail cross-sectional view on about line 3 3, Fig. 1, showing the uprights and rails seated in the recesses of the sill-bars; and Fig. 4 is a detail perspective view showing the bottom detached.

In forming the bottom of my crate I employ the sill-bars A, which are recessed or rabbeted in their upper outer edges at B to form seats for the uprights C and the rails D. These sill-bars are also notched or rabbeted crosswise at E to form seats for the base-bars F, which rest at their ends in said rabbets, as shown. The sill-bars A may be formed in one piece, and in practice it is found convenient to so construct them; but where desired they may be made in two or more longitudinal sections suitably formed and united to provide the recesses or rabbets before described. The bottom strips G may extend either crosswise, as shown, or longitudinally, if desired, being supported in the former instance by resting upon the base-bars, as shown. These bottom strips G are spaced apart to correspond with the spaces of the berry-cups fitted in the crate to facilitate ventilation and in use form an elastic or flexible bottom for the fruit to rest upon.

The top H of the crate is provided with battens $h$, so placed that when the crates are piled one on top of the other the sill-bars A at the bottom of one crate will come down alongside the battens $h$ of the next lower crate, thus locking the crates together and keeping them steady in the car or ship during transportation.

It will be noticed that the sill-bars project at $a$ downward, forming a solid bearing upon which the crate may stand, and also holding the bottom strips above the surface on which the crate is supported, furnishing a perfect system of ventilation as desired.

Having thus described my invention, what I claim, and desire to secure by Letters Patent, is—

1. A crate having a ventilated elastic bottom having side bars projecting downward and forming an air-space, such bars being recessed or rabbeted to receive the uprights and rails, the bottom strips spaced apart corresponding with the spaces between the cups in the crate and the base-bars seated in the sill-bars substantially as described.

2. In a crate, the combination with the uprights, the bottom strip and the base-bars, of the sill-bars provided in their upper sides with the longitudinal recesses or rabbets for the uprights and with the cross recesses or rabbets for the base-bars, substantially as described.

3. A crate having sill-bars provided in their upper edges at their outer sides with recesses or rabbets forming seats for the uprights and having cross-notches for the base-bars, the base-bars seated at their ends in said notches, the uprights fitted at their lower ends in the recesses or rabbets of the sill-bars, the rails seated in said recesses and extending outside the lower ends of the uprights and the bottom strips, substantially as described.

4. An improved crate comprising the sill-bars recessed or rabbeted longitudinally at the outer edges of their upper sides and having their ends notched or rabbeted crosswise in their upper sides, the uprights and end rails seated in the longitudinal recesses and the base-bars seated at their ends in the end cross-notches of the sill-bars substantially as described.

5. An improved crate comprising the sill-bars recessed longitudinally in their upper sides at their outer edges, and transversely on their upper sides at their ends, the uprights and rails seated in the longitudinal recesses, the base-bars seated in the transverse end recesses, and the bottom strips supported on the base-bars substantially as described.

JOHN F. EAST.

Witnesses:
H. J. PAYLOR,
E. M. LAW.